Dec. 20, 1927.
M. KIMMERLING
TIRE STRIPPING MACHINE
Filed Dec. 28, 1926
1,653,104
2 Sheets-Sheet 2
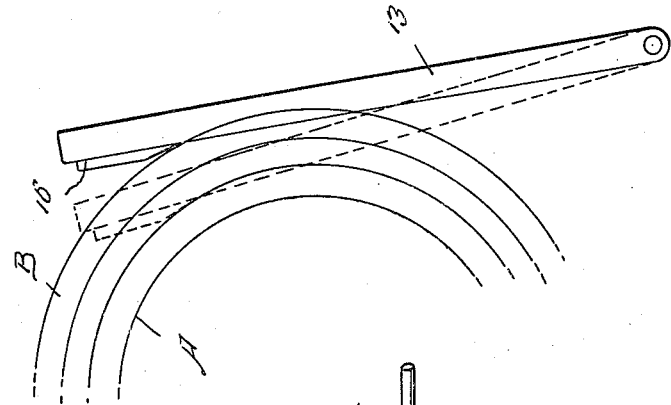
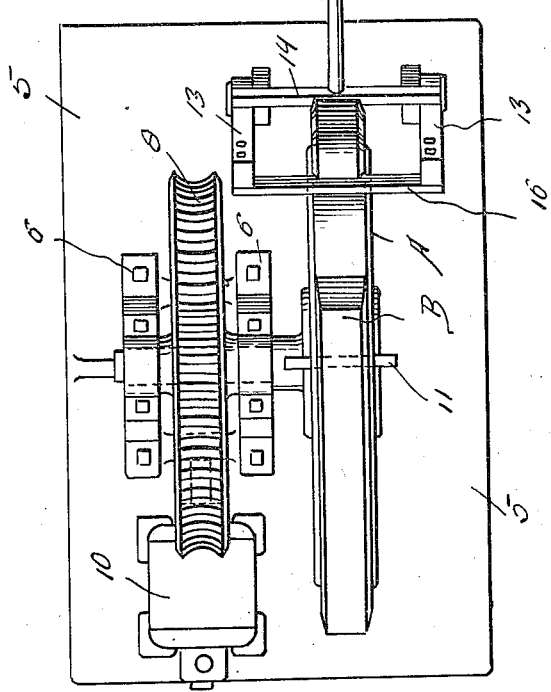
Inventor
Michel Kimmerling
By Clarence A O'Brien
Attorney Patented Dec. 20, 1927.

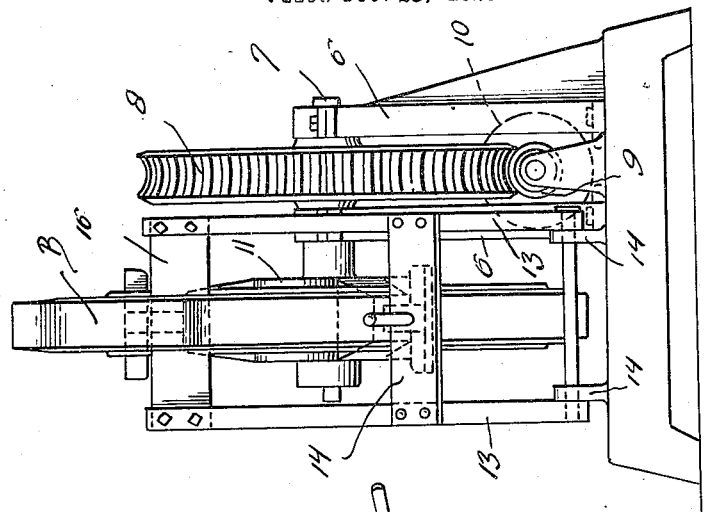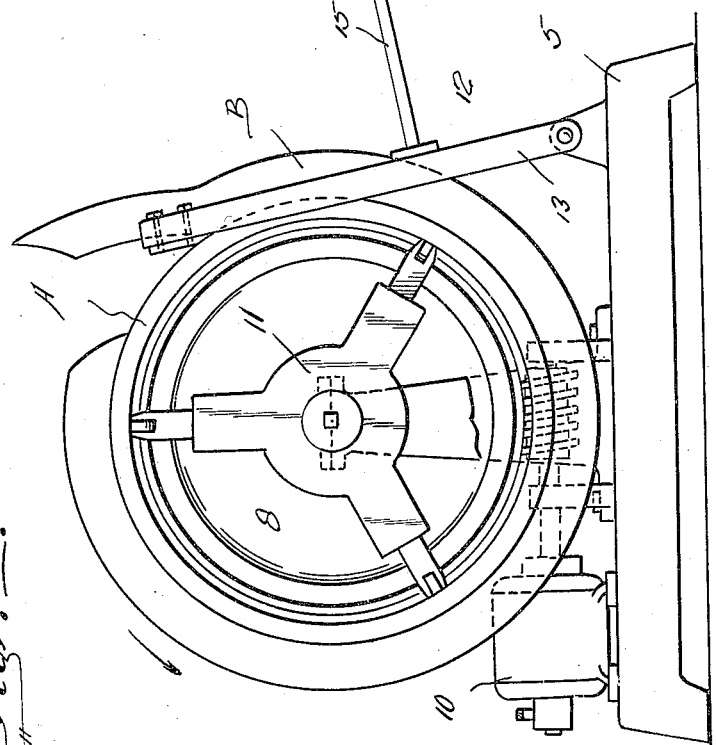

1,653,104

UNITED STATES PATENT OFFICE.

MICHEL KIMMERLING, OF BIRMINGHAM, ALABAMA.

TIRE-STRIPPING MACHINE.

Application filed December 28, 1926. Serial No. 157,522.

This invention relates to new and useful improvements in tire stripping machines particularly adapted for stripping solid rubber tires from their carrying rims, and has for its primary object to substantially improve and simplify that type of tire stripping machine shown and described in Patent No. 1,609,514, granted to me December 7, 1926.

To the attainment of this end I provide a tire stripping machine wherein the cutting knife is maintained against transverse movement with respect to the tire and instead of cutting the tire from the rim in a saw like manner, as in the device disclosed in said patent, the knife makes a straight cut through the tire during the rotation of the same. Through the provision of a cutting knife of this character, the construction of the machine is considerably simplified, and at the same time a smooth cut is provided which is not always the case when performing the operation by the use of the machine disclosed in my prior patent.

A further and important object is to provide a tire stripping machine of this character wherein the cutting knife is mounted for swinging movement toward and away from the periphery of the tire and wherein the cutting edge of the knife blade per se is such that said cutting edge will seek the surface of the tire carrying rim and smoothly cut the tire from said rim surface regardless of whether or not the rim is true or warped.

Other objects will become apparent as the nature of the invention is better understood, the same comprising the novel form, combination, and arrangement of parts hereinafter more fully described, shown in the accompanying drawings and claimed.

In the drawings wherein like reference characters indicate corresponding parts throughout the several views:

Figure 1 is a front end elevation of a tire stripping machine constructed in accordance with the present invention, the same being shown as actually performing a tire stripping operation.

Figure 2 is a view of the knife carrying side of the machine.

Figure 3 is a top plan view thereof, and

Figure 4 is a diagrammatic view disclosing the position of the knife at the start of the stripping operation and the position that the same assumes after the knife has cut through the tire and reached the rim surface.

Now having particular reference to the drawings wherein there is disclosed the most practical embodiment of the invention with which I am at this time familiar, the machine consists of a substantially rectangular shaped supporting base 5 upon the top side of which at one edge is a pair of transversely spaced vertically extending and parallel shaft supporting standards 6—6 upon which is mounted one end of a transversely extending shaft 7 that is equipped between the standards with a relatively large worm gear 8 that has mesh with a worm 9 upon one end of the armature shaft of an electric motor 10 supported upon the base 5 as clearly indicated in Figures 1 and 3.

Upon the outer end of this shaft 7 is a conventional universal chuck 11 for receiving solid tire carrying rims of various sizes, the rim being designated A while the solid tire mounted thereon is designated B.

At the end of the base 5 opposite from the motor 10 is a knife blade carrying unit designated generally by the reference character 12. This unit consists of a pair of elongated and parallel spaced arms 13—13 the lower ends of which are pivotally connected to vertical supporting ears 14—14 formed upon the top side of the base. These arms are interconnected at a point above the pivotal connection thereof by cross brace 14 projecting rearwardly from which is an operator's handle 15. Extending transversely between the upper ends of the arms 13—13 and secured to the inner edges thereof is a cutting blade 16, the lower edge of which is the cutting edge and which cutting edge is greatly beveled at its inner surface so as to lay against the rim A after a cut has been made through the tire B for preventing the cutting of the rim during the rotation of the same in the direction of the arrow in Figure 1.

In actual practice the knife blade carrying unit is swung toward the tire B until the edge of the knife blade rests against the surface of the tire as per the full lines in Figure 4. The machine is then started for rotating the tire in the direction of the arrow in Figure 1, and immediately the knife will cut directly through the tire until the same has reached the rim A after which the tire will be thoroughly stripped from the rim due to the fact that the springy action of the cut rubber tends to force the knife into firm engagement with the rim surface. Furthermore, owing to the pivotal connection of the cutting unit, the knife blade thereof will at all times ride against the surface of the rim even though the same may be greatly bent with the result that the tire will be stripped from the rim at the surface of the rim.

In view of the foregoing description when considered in conjunction with the accompanying drawings, it will at once be apparent that I have provided a highly novel, simple, and efficient tire stripping machine that is well adapted for all the purposes heretofore designated, even though I have herein shown and described the invention as consisting of certain detail structural elements, it is nevertheless to be understood that minor changes may be made therein without effecting the spirit and scope of the appended claims.

Having thus described the invention, what I claim as new is:—

1. In a tire stripping machine of the character described, a base, a shaft journaled above the base, a tire rim chuck mounted upon the shaft, a knife blade carrying frame pivoted at its lower end to the base and extending upwardly at the side of the shaft, and a knife blade at the upper end of the frame parallel with the shaft adapted to cut through the tire upon the rim and strip the same therefrom when the shaft is rotated.

2. In a tire stripping machine of the character described, a base, a shaft journaled above the base, a tire rim chuck mounted upon the shaft, a knife blade carrying frame pivoted at its lower end to the base and extending upwardly at the side of the shaft, a knife blade at the upper end of the frame parallel with the shaft adapted to cut through the tire upon the rim and strip the same therefrom when the shaft is rotated, the inner surface of the blade cutting edge being beveled to conform to the curvature of the rim so as to rest snugly against the rim surface during the stripping operation.

3. In a tire stripping machine of the character described, a base, a shaft journaled upon the base, a tire rim chuck mounted upon the shaft, a knife blade carrying frame pivoted to the base and extending upwardly at the side of the chuck and terminating above the center thereof, and a knife blade secured to the upper end of the frame and parallel to the shaft in a manner and for a purpose described.

4. In a tire stripping machine of the character described, a rotating shaft, means upon the shaft whereby a tire carrying rim may be supported thereon, a knife blade carrying frame pivoted at its lower end at the side of the shaft extending upwardly above the shaft, and a knife blade at the upper end of the frame parallel with the shaft adapted to cut through the tire upon the rim and then strip the same therefrom during the rotation of the shaft.

5. In a tire stripping machine of the character described, a rotating shaft, means upon the shaft whereby a tire carrying rim may be secured thereto, and a blade parallel to the shaft pivoted in position at one side of the shaft and arranged above the shaft and the upper side of the tire carrying rim, said knife adapted to bite into and strip the tire from the rim during the rotation thereof.

6. In a tire stripping machine of the class described, a base, a rotating shaft, means upon the shaft whereby a tire carrying rim may be secured thereto, a blade carrying unit pivotally secured on the base adjacent said shaft, said unit including a pair of parallel spaced arms pivotally secured at their lower ends on the base, a cutting blade extending transversely across the upper ends of the arms, the arms being disposed on opposite sides of the tire carrying rim, the cutting edge of the blade adapted to strip the tire from the rim during the rotation of the latter.

In testimony whereof I affix my signature.

MICHEL KIMMERLING.